US012215846B2

(12) United States Patent
Suttles et al.

(10) Patent No.: US 12,215,846 B2
(45) Date of Patent: Feb. 4, 2025

(54) LINEAR FIXTURE ELECTRO-MECHANICAL JOINING

(71) Applicant: ABL IP HOLDING LLC, Conyers, GA (US)

(72) Inventors: Benjamin M. Suttles, McDonough, GA (US); Robert Wayne Mock, Jr., Lawrenceville, GA (US); Jamie R. Graves, Winona, MN (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 18/210,293

(22) Filed: Jun. 15, 2023

(65) Prior Publication Data

US 2024/0418354 A1 Dec. 19, 2024

(51) Int. Cl.

| | |
|---|---|
| ***F21V 21/005*** | (2006.01) |
| ***F21S 2/00*** | (2016.01) |
| ***F21S 4/28*** | (2016.01) |
| ***F21V 17/12*** | (2006.01) |
| ***F21V 23/06*** | (2006.01) |

(52) U.S. Cl.

CPC .............. *F21V 23/06* (2013.01); *F21S 2/005* (2013.01); *F21S 4/28* (2016.01); *F21V 17/12* (2013.01)

(58) Field of Classification Search

CPC . F21V 23/06; F21V 17/12; F21S 2/005; F21S 4/28

See application file for complete search history.

(56) References Cited

U.S. PATENT DOCUMENTS

| | | | | |
|---|---|---|---|---|
| 10,082,262 | B2 | 9/2018 | Butler et al. | |
| 10,527,262 | B2 * | 1/2020 | SanFacon | F21V 15/015 |
| 2021/0285626 | A1 * | 9/2021 | Tweel | F21V 21/088 |

* cited by examiner

*Primary Examiner* — Elmito Breval

(74) *Attorney, Agent, or Firm* — Buchanan Ingersoll & Rooney PC

(57) ABSTRACT

A light fixture system includes a first light fixture that includes a first fixture wire harness coupled to a first electrical connector mounted to a first joiner. The first joiner is attached to the first light fixture. The light fixture system further includes a second light fixture that includes a second fixture wire harness coupled to a second electrical connector mounted to a second joiner. The second joiner is attached to the second light fixture. The first joiner and the second joiner are configured to slide towards each other and include at least one set screw to apply axial force between adjoining light fixtures to make electrical connection and tighten a joint between the first light fixture and the second light fixture.

19 Claims, 6 Drawing Sheets

LINEAR FIXTURE ELECTRO-MECHANICAL JOINING

BACKGROUND

Existing install-from-below linear light fixtures usually either require drywall or ceiling material to support the light fixture weight. Or such light fixtures typically require some disassembly of the light fixture in the field to get access to a structure-mounted threaded rod that protrudes through the upper light fixture housing behind light sources.

Electrical connections between the light fixture segments usually requires disassembly of the light fixture to access the wireway. Or such electrical connection requires connecting flexible wire harnesses that are subject to pinching between light fixture segments while subsequent sections are raised into the ceiling. A similar problem exists for suspended linear row light fixtures. Accessing internal harnesses to make light fixture-to-fixture connections is very difficult to do while also bringing the fixtures together to mechanically connect the light fixtures.

Existing hard-ceiling recessed light fixtures lack a method to provide positive joining force between light fixture segments after the light fixtures are installed in the ceiling. Existing recessed linear light fixtures lack a method to provide alignment between light fixture segments. This is typically because alignment plates that cross between light fixture segments would require one light fixture to slide towards the adjacent light fixture after installation in the ceiling and that would require a hole in the drywall longer than the light fixture run. The hole would then be visible after installation.

Linear fixture electro-mechanical joining equipment and techniques are needed to overcome these and other limitations in the art.

SUMMARY

In a first example, a light fixture system 100 includes a first light fixture 101A that includes a first fixture wire harness 102A coupled to a first electrical connector 103A mounted to a first joiner 104A. The first joiner 104A is attached to the first light fixture 101A. The light fixture system 100 further includes a second light fixture 101B that includes a second fixture wire harness 102B coupled to a second electrical connector 103B mounted to a second joiner 104B. The second joiner 104B is attached to the second light fixture 101B. The first joiner 104A and the second joiner 104B are configured to slide towards each other and include at least one set screw 105A-B to apply axial force between adjoining light fixtures 101A-B to make electrical connection and tighten a joint 107 between the first light fixture 101A and the second light fixture 101B.

In a second example, a light fixture joining assembly 116 includes a first fixture wire harness 102A coupled to a first electrical connector 103A mounted to a first joiner 104A. The first joiner 104A is configured to attach to a first light fixture 101A. The light fixture joining assembly 116 further includes a second fixture wire harness 102B coupled to a second electrical connector 103B mounted to a second joiner 104B. The second joiner 104B is configured to attach to a second light fixture 101B. The first joiner 104A and the second joiner 104B are configured to slide towards each other and include at least one set screw 105A-B to apply axial force between adjoining light fixtures 101A-B to make electrical connection and tighten a joint 107 between the first light fixture 101A and the second light fixture 101B.

BRIEF DESCRIPTION OF THE DRAWINGS

The drawing figures depict one or more implementations in accord with the present teachings, by way of example only, not by way of limitation. In the figures, like reference numerals refer to the same or similar elements.

PARTS LISTING

Figure 1:
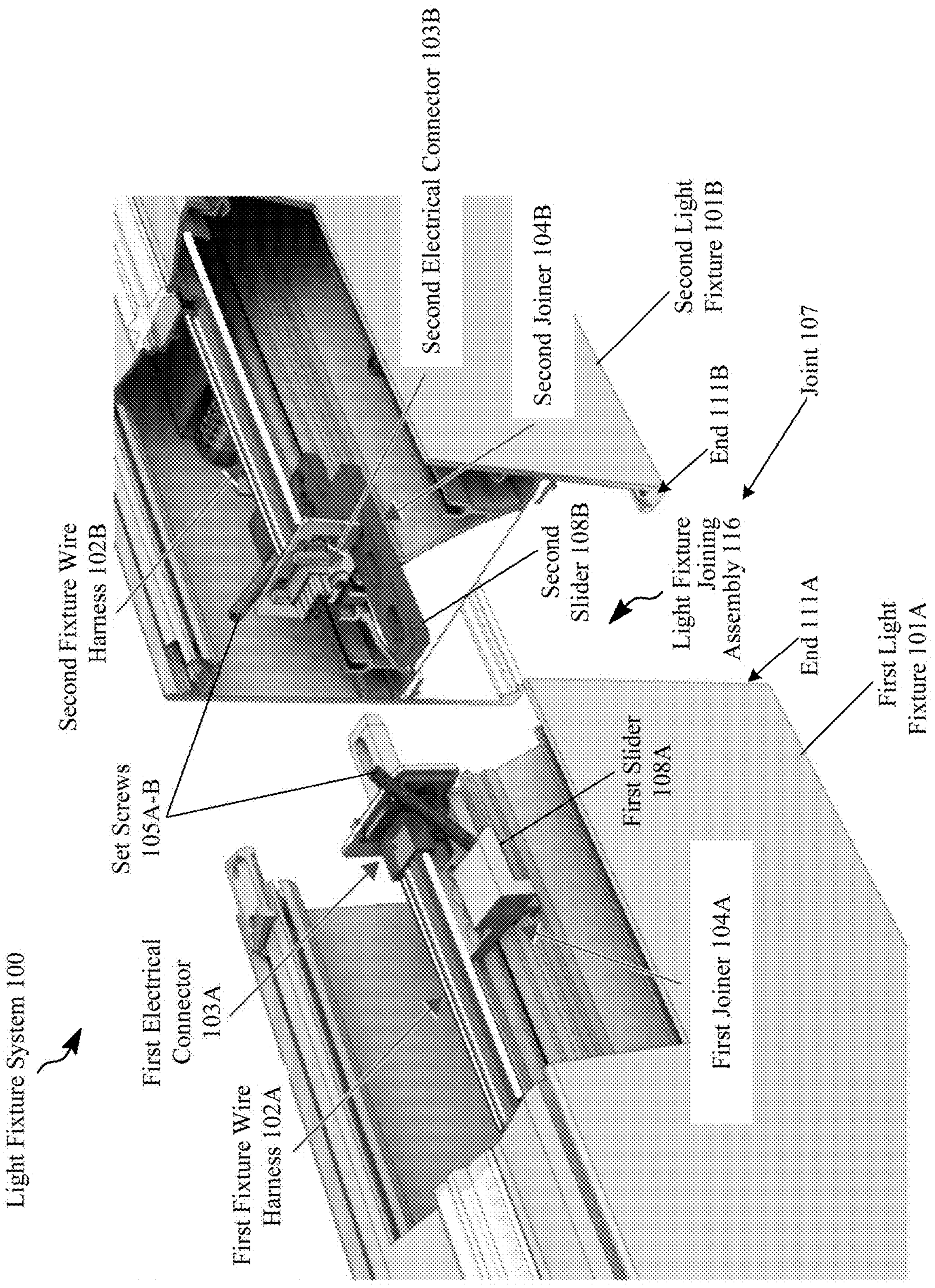
FIG. 1 is a cutaway view of a light fixture system depicting separation of a joint between adjoining light fixtures (e.g., pendant type) and a light fixture joining assembly.

- 100 Light Fixture System
- 101A-B Light Fixtures
- 102A-B Fixture Wire Harnesses
- 103A-B Fixture Electrical Connectors
- 104A-B Joiners
- 105A-B Set Screws
- 106 Electrical Connection
- 107 Joint
- 108A-B Slider (e.g., Arm or Protrusion)
- 109A-N Light Sources
- 110A-B Slots
- 111A-B Ends
- 115 Joined Light Fixture
- 116 Light Fixture Joining Assembly
- 119 Aircraft Cable Suspension System
- 120 Aircraft Cable
- 121A-B Ceiling
- 122 Aircraft Cable Gripper
- 123 Aircraft Cable Anchor Bracket
- 124 Aircraft Cable Ball Stop
- 125 Fixture Housing
- 126 Aircraft Cable Guide Bracket
- 127 Light Source Circuit Board
- 128A-N Light Sources
- 130A-B Ledges
- 131 Optical Element (e.g., Lens, Diffuser, or Combination Thereof)

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "light fixture" as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a light fixture may provide light for use by automated equipment, such as sensors/monitors, robots, etc. that may occupy or observe the illuminated space, instead of or in addition to light provided for an organism. However, it is also possible that one or more light fixtures in or on a particular premises have other lighting purposes, such as signage for an entrance or to indicate an exit. In most examples, the light fixture(s) illuminate a space or area of a premises to a level useful for a human in or passing through the space, e.g., of sufficient intensity for general illumination of a room or corridor in a building or of an outdoor space such as a street, sidewalk, parking lot or performance venue. The actual light source of illumination light in or supplying the light for a light fixture may be any type of artificial light emitting device, several examples of which are included in the discussions below.

The term "light fixture system," as used herein, is intended to encompass essentially any type of system that either includes a number of such light fixtures coupled together for data communication and/or light fixture(s) coupled together for data communication with one or more control devices, such as wall switches, control panels, remote controls, central lighting or building control systems, servers.

Terms such as "artificial lighting" or "illumination lighting" as used herein, are intended to encompass essentially any type of lighting that a device produces light by processing of electrical power to generate the light. A light fixture for an artificial lighting or illumination lighting application, for example, may take the form of an arrangement that incorporates a suitable light source, where the lighting device component or source(s) by itself contains no intelligence or communication capability. The illumination light output of an artificial illumination type light fixture, for example, may have an intensity and/or other characteristic(s) that satisfy an industry acceptable performance standard for a general lighting application.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

FIG. 1 is a cutaway view of a light fixture system 100 depicting separation of a joint 107 between adjoining light fixtures 101A-B and a light fixture joining assembly 116. In the example of FIG. 1, the light fixtures 101A-B are pendant type. Light fixture system 100 includes a first light fixture 101A that includes a first fixture wire harness 102A coupled to a first electrical connector 103A mounted to a first joiner 104A. The first joiner 104A is attached to the first light fixture 101A. The light fixture system 100 further includes a second light fixture 101B that includes a second fixture wire harness 102B coupled to a second electrical connector 103B mounted to a second joiner 104B. The second joiner 104B is attached to the second light fixture 101B. The first joiner 104A and the second joiner 104B are configured to slide towards each other and include at least one set screw 105A-B to apply axial force between adjoining light fixtures 101A-B to make electrical connection and tighten a joint 107 between the first light fixture 101A and the second light fixture 101B.

A light fixture joining assembly 116 includes a first fixture wire harness 102A coupled to a first electrical connector 103A mounted to a first joiner 104A. The first joiner 104A is configured to attach to a first light fixture 101A. The light fixture joining assembly 116 further includes a second fixture wire harness 102B coupled to a second electrical connector 103B mounted to a second joiner 104B. The second joiner 104B is configured to attach to a second light fixture 101B. The first joiner 104A and the second joiner 104B are configured to slide towards each other and include at least one set screw 105A-B to apply axial force between adjoining light fixtures 101A-B to make electrical connection and tighten a joint 107 between the first light fixture 101A and the second light fixture 101B.

Light fixture joining assembly 116 can include sliding electro-mechanical joiners 104A-B that are configured to operate in the following sequence. The joiner 104A-B on each end 111A-B of the light fixture 101A-B is configured to be retracted so that the joiner 104A-B does not protrude past the end 111A-B of the light fixture segment. Adjoining light fixtures 101A-B (e.g. adjacent) are then raised into the ceiling and brought into initial end-to-end 111A-B contact.

The first joiner 104A and the second joiner 104B include sliders 108A-B, such as an arm or a protrusion configured to slide toward each other. The arm or the protrusion can be integral to the first joiner 104A and the second joiner 104B. The joiners 104A-B are configured to be slid towards each other using sliders 108A-B. The first joiner 104A is configured to be retracted on a first end 111A of the first light fixture 101A and the second joiner 104B is configured to be retracted on a second end 111B of the second light fixture 101B until being slid towards each other.

Sliders 108BA-B of the light fixture joining assembly 115 can be formed integrally with the joiners 104A-B (e.g., as one component or piece). Or the sliders 108A-B and the joiners 104A-B can be formed separately and then connected together. For example, the joiners 104A-B and sliders 108A-B can be formed using casting or injection molding to form a single integral piece.

Figure 2:
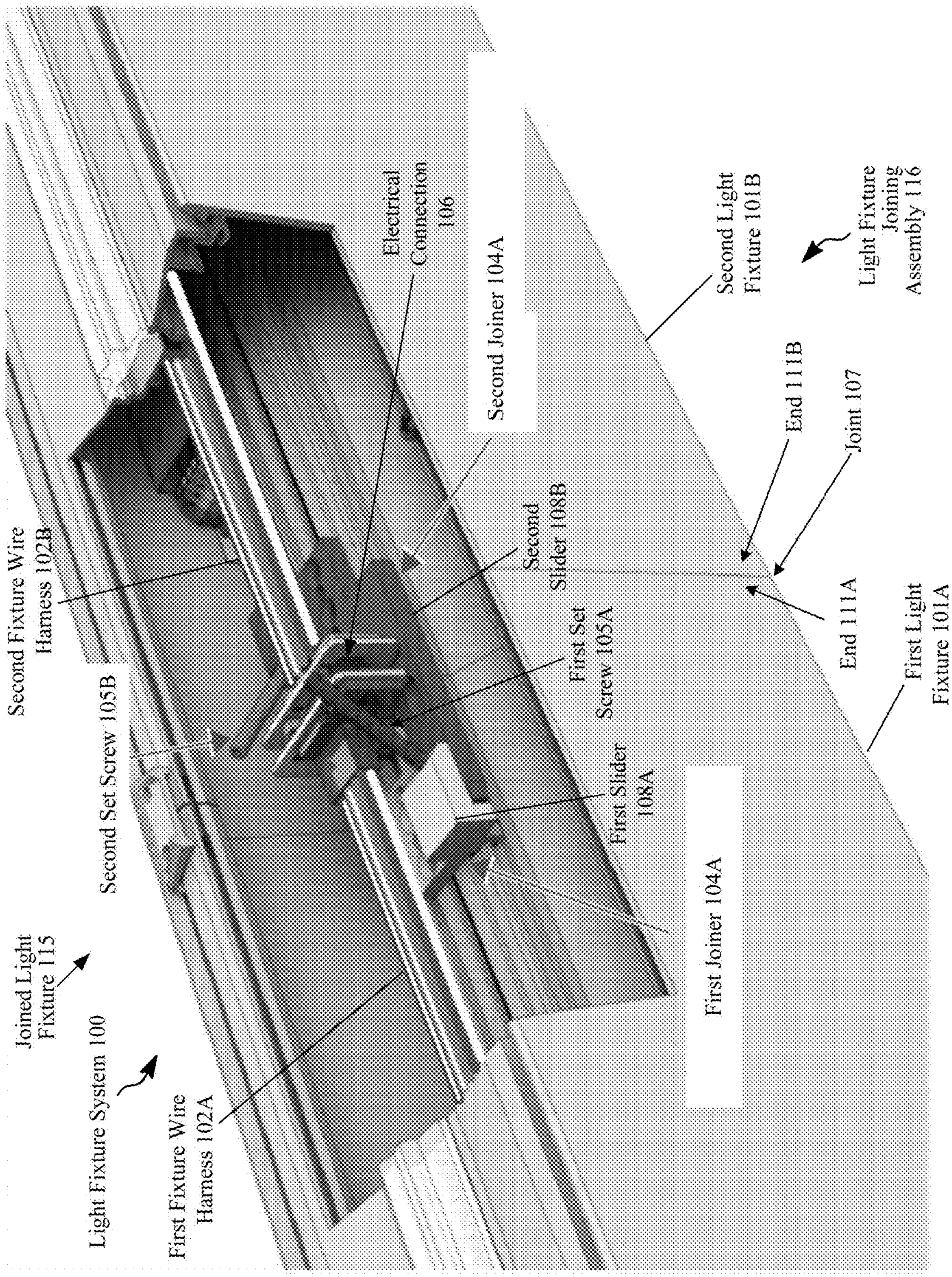
FIG. 2 is a cutaway view of the adjoining light fixtures of FIG. 1 depicting a joined light fixture resulting from tightening of the joint via the light fixture joining assembly.

FIG. 2 is a cutaway view of the adjoining light fixtures 101A-B of FIG. 1 depicting a joined light fixture 115 resulting from tightening of the joint 107 via the light fixture joining assembly 116. The set screws 105A-B can be configured to act on the joiners 104A-B to provide axial force between the light fixtures 101A-B and draw them tight against each other. The act of tightening the joiners 104A-B together also engages electrical connection(s) 106 that are mounted to the joiners 104A-B, thus electrically connecting the adjoining light fixtures 101A-B.

The first joiner 104A is configured to protrude past a first end 111A of the first light fixture 101A and the second joiner 104B is configured to protrude past a second end 111B of the second light fixture 101B to make electrical connection 106 in response to being slid towards each other and the axial force from the at least one set screw 105A-B.

Figure 3:
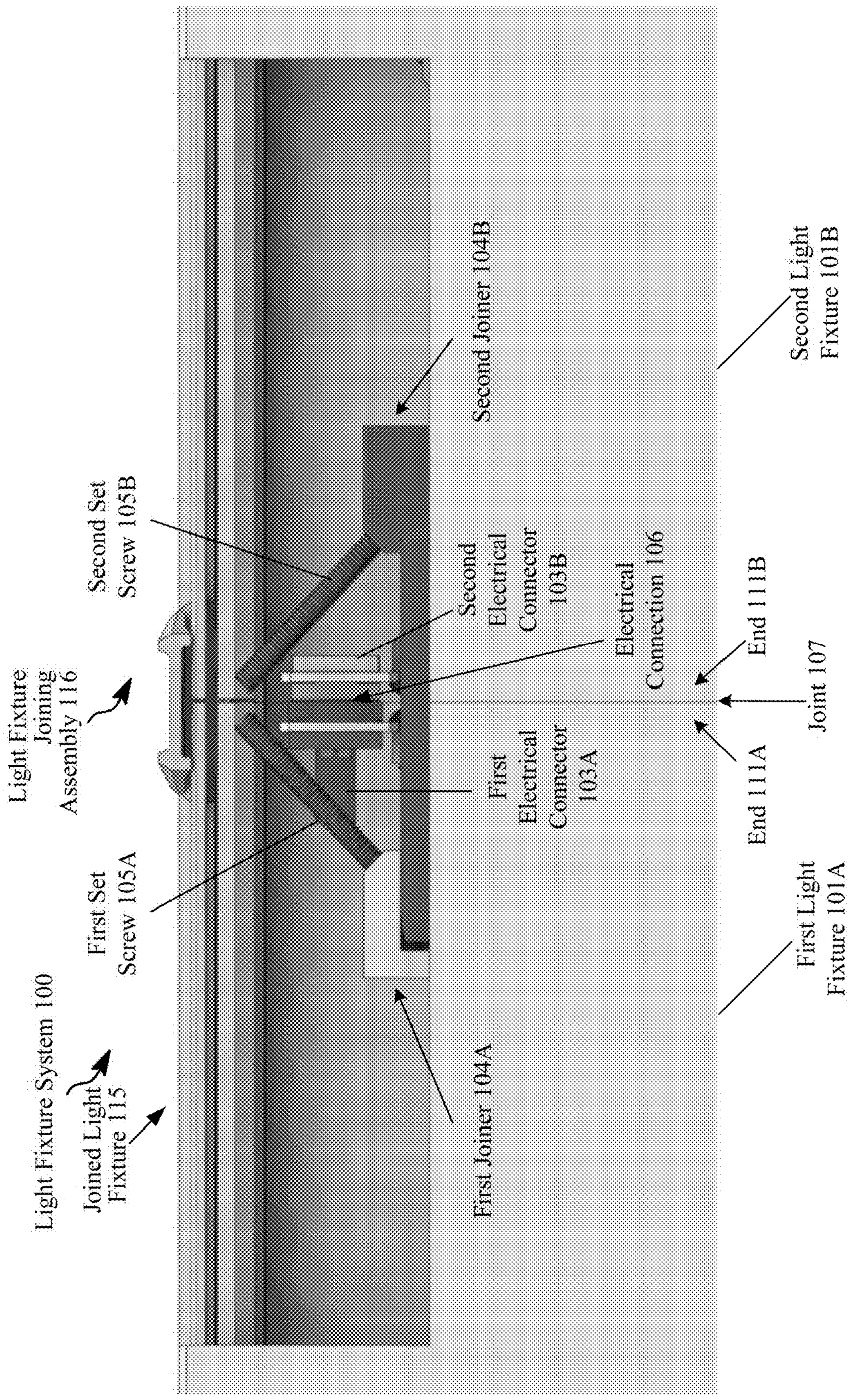
FIG. 3 is a side cutaway view of the adjoining light fixtures of FIGS. 1-2 depicting the joined light fixture.

FIG. 3 is a side cutaway view of the adjoining light fixtures 101A-B of FIGS. 1-2 depicting the joined light fixture 115. In the pendant type of light fixtures 101A-B example of FIGS. 1-3, the light fixtures 101A-B can be hanging from cable and swing apart and brought together for joining. Hence, the electrical contacts are mounted at both halves of the joint 107 to make electrical connection 106 by extending the first slider 108A and the second slider 108B towards each other from the initial retracted position.

Figure 4:
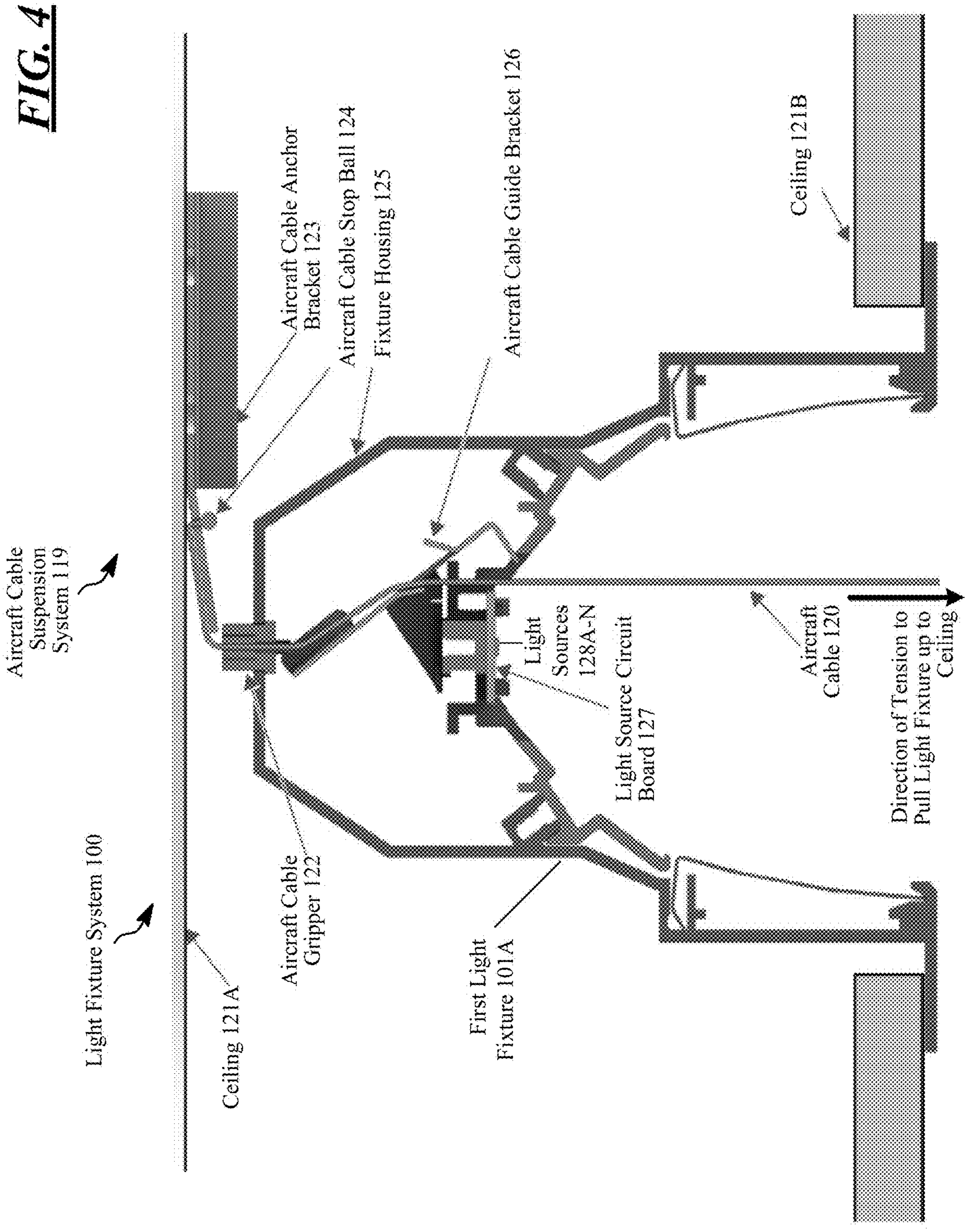
FIG. 4 depicts an aircraft cable mounting system for light fixtures, such as for recessed type light fixtures.
Figure 5:
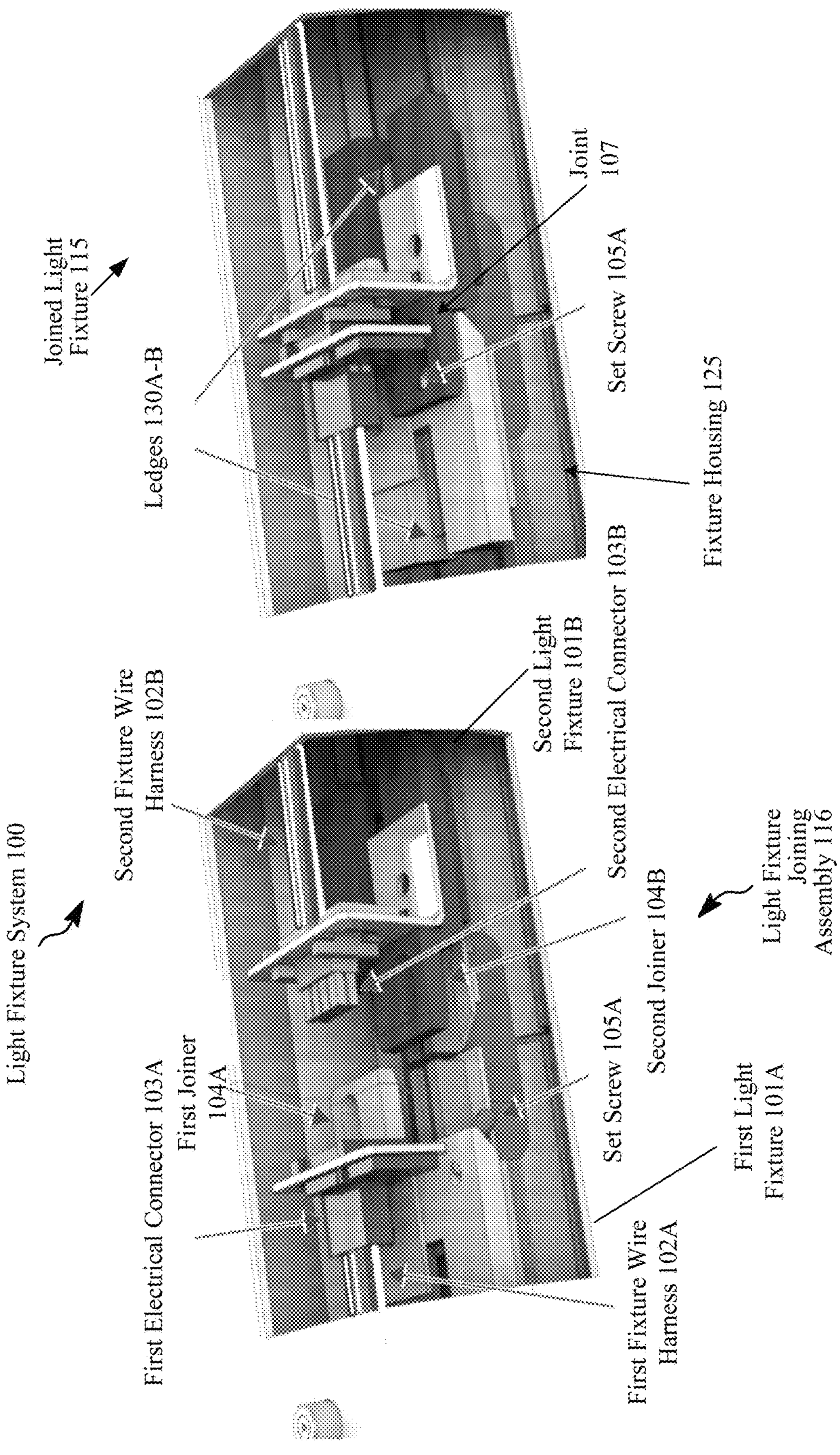
FIG. 5 is a cutaway view of a light fixture system depicting separation of a joint between adjoining light fixtures (e.g., recessed type) and the light fixture joining assembly.
Figure 6:
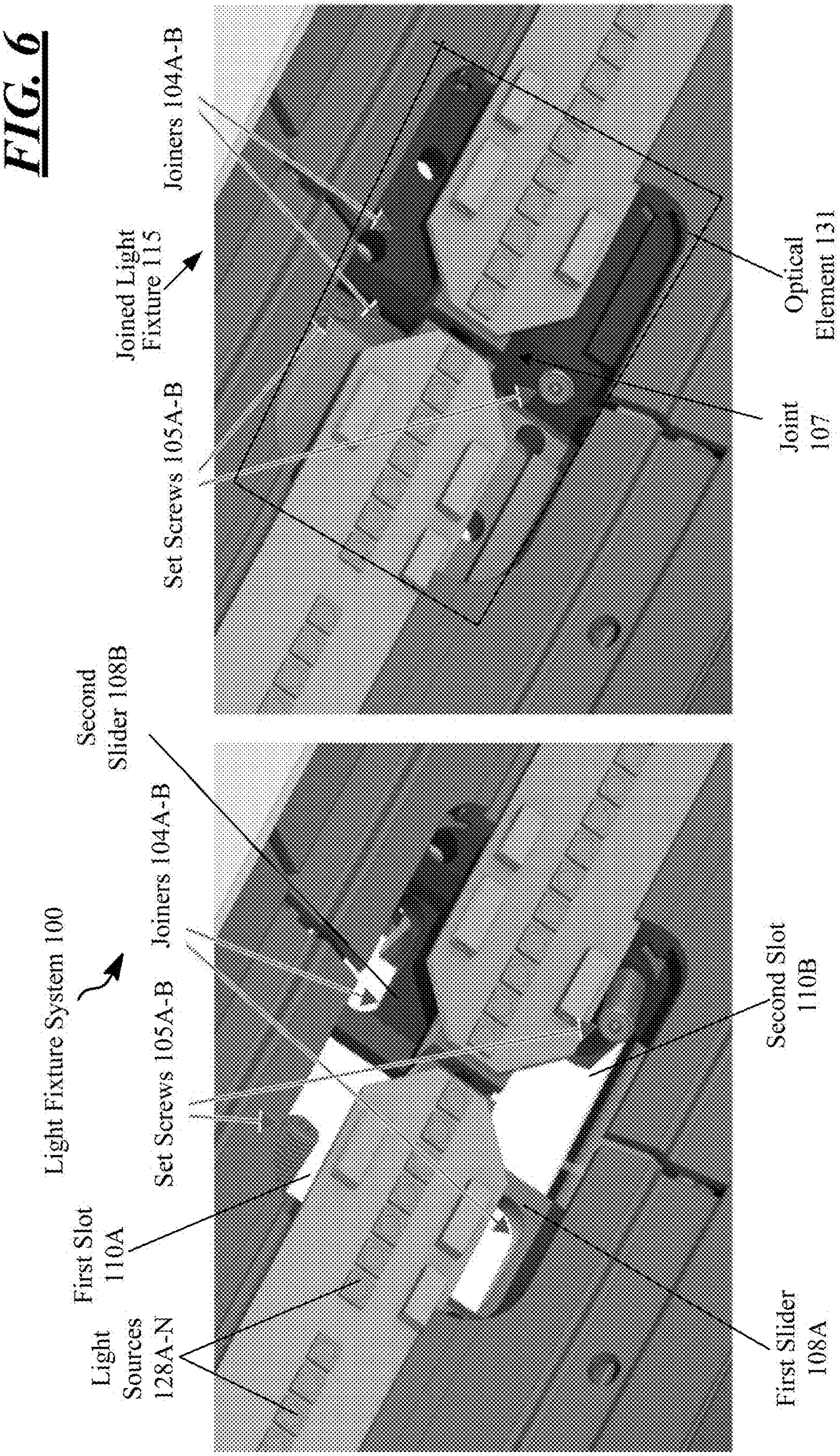
FIG. 6 is a bottom view of the adjoining lighting fixtures 101A-B of FIG. 5 depicting both separation and connection of the joint.

FIGS. 4-6 below depict and describe an example of the joiners 104A-B that operate in the same way for suspended linear pendant type of light fixtures 101A-B (i.e., that join two adjacent pendant sections while also making the wiring connections between them). Hence, FIG. 4 depicts an aircraft cable suspension system 119 for light fixtures 101A-B, which are recessed type fixtures in the example. For recessed type light fixtures, it can be difficult to fly the light fixtures 101A-B in axial directions away from each other. Joiners 104A-B can be slid into the envelope of a fixture housing 125 and in a retracted position and then extended out to the set position to fit the hole in a second ceiling 121B.

Aircraft cable suspension system 119 includes an aircraft cable anchor bracket 123 configured to attach to a first ceiling 121A. The first light fixture 101A includes a fixture housing 125 and the aircraft cable anchor bracket 123 is mounted outside the fixture housing 125 on the first ceiling 121A. The aircraft cable suspension system 119 further includes an aircraft cable 120 that is attached and held in place to the aircraft cable anchor bracket 123 via an aircraft cable stop ball 124.

The aircraft cable anchor bracket 123 is configured to provide some pre-load tension on the aircraft cable 120 to pull light fixtures 101A-N tightly against a second ceiling 121B. Aircraft cable suspension system 119 further includes an aircraft cable gripper 122 to hold the aircraft cable 120 in place and suspend the aircraft cable 120. The aircraft cable suspension system 119 further includes an aircraft cable guide bracket 126 configured to guide the aircraft cable 120 to exit a bottom of a first light fixture 101A next to the light source circuit board 127 of the first light fixture 101A when pushed from the top. The light source circuit board 127 can be an LED printed circuit board. The aircraft cable suspension system 119 guides the aircraft cable 120 around light sources 128A-N of the light source circuit board 127 to allow tension to be applied to the aircraft cable 120 without removing the light sources 128A-N and the aircraft cable anchor bracket 123.

FIG. 5 is a cutaway view of a light fixture system 100 depicting both separation and connection of a joint 107 between adjoining light fixtures 101A-B (e.g., recessed type) and the light fixture joining assembly 116. The light fixture joining assembly 116 is like that described in FIGS. 1-3. In FIG. 5, the view is of the joiners 104A-B as seen from above the ceiling 121B. On the left, joiners 104A-B and are retracted to allow the light fixtures 101A-B to be lifted into the ceiling without shifting in the light fixture axis direction. On the right, joiners 104A-B are connected together by tightening set screws 105A-B providing attachment force in the axial direction between light fixtures 101A-B and securing the electrical connection 106 (e.g., male/female plugs) between the light fixtures 101A-B.

The first light fixture 101A and the second light fixture 101B include a fixture housing 125 and a ledge 130A-B disposed inside the fixture housing 125 configured to stop the first joiner 104A and the second joiner 104B from sliding out of the fixture housing 125 and provide a bearing surface to slide the first joiner 104A and the second joiner 104B towards each other. As shown, ledges 130A-N can be machined into the fixture housing 125 of the light fixtures 101A-B. Ledges 130A-N are configured to stop joiners 104A-B from sliding out of the light fixtures 101A-B and provide bearing surfaces for the joiners 104A-B to pull the light fixtures 101A-B together.

FIG. 6 is a bottom view of the adjoining lighting fixtures 101A-B of FIG. 5 depicting both separation and connection of the joint 107. In FIG. 6, the view is of the joiners 104A-B as seen from below the ceiling 121B. On the left, the joiners 104A-B are retracted to allow the light fixtures 101A-B to be lifted into the ceiling 121B without shifting in the light fixture axis direction. On the right, the joiners 104A-B are connected together by tightening set screws 105A-B providing attachment force in the axial direction between light fixtures 101A-B and securing the electrical connection 106 between the light fixtures 101A-B.

Sliders 108A-B can pass through slots 110A-B located on either side of the light sources 109A-N. The set screws 105A-B can be configured to be tightened through the same slots 110A-B located on either side of the light sources 128A-N. The light fixture system 100 can further comprise an optical element 131, such as a lens, a diffuser, or a combination thereof to conceal the first joiner 104A and the second joiner 104B.

The first light fixture 101A and the second light fixture 101B comprise a plurality of light sources 128A-N. The first and second sliders 108A-B (e.g., arm or protrusion) pass through a slot 110A-B located around the plurality of light sources 128A-N. The at least one set screw 105A-B is configured to be tightened through the slot 110A-B.

The optical element 131, such as a lens, diffuser, or a combination thereof, can be installed over the light sources 128A-N and is configured to conceal the slots 110A-B that allowed access to the sliding joiners 104A-B. Set screws 105A-B can be oriented at approximately 45 degrees and configured to pull against a vertical wall in a piece that protrudes against the other light fixture 101B.

Light sources 128A-N include electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as +5% or as much as +10% from the stated amount. The terms "approximately," "significantly," or "substantially" means that the parameter value or the like varies up to +25% from the stated amount.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "containing," "contain", "contains," "with," "formed of," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A light fixture system, comprising:

a first light fixture that includes a first fixture wire harness coupled to a first electrical connector mounted to a first joiner, wherein the first joiner is attached to the first light fixture; and a second light fixture that includes a second fixture wire harness coupled to a second electrical connector mounted to a second joiner, wherein the second joiner is attached to the second light fixture;

wherein the first joiner and the second joiner are configured to slide towards each other and each include at least one set screw configured to be tightened through at least one slot to apply axial force between adjoining light fixtures to make electrical connection and tighten a joint between the first light fixture and the second light fixture, the at least one slot being located underneath a light source circuit board to allow access to the first and second joiners after the adjoining light fixtures are lifted in the ceiling; and an optical element configured to conceal the at least one slot allowing access to the first and second joiners.

2. The light fixture system of claim 1, wherein the first joiner and the second joiner include an arm or a protrusion configured to slide toward each other.

3. The light fixture system of claim 2, wherein the arm or the protrusion are integral to the first joiner and the second joiner.

4. The light fixture system of claim 3, wherein:

the first light fixture and the second light fixture comprise a plurality of light sources; and the arm or the protrusion pass through the at least one slot located around the plurality of light sources.

5. The light fixture system of claim 3, wherein:

the first light fixture and the second light fixture include a fixture housing and a ledge disposed inside the fixture housing configured to stop the first joiner and the second joiner from sliding out of the fixture housing and provide a bearing surface to slide the first joiner and the second joiner towards each other.

6. The light fixture system of claim 5, wherein:

the ledge is machined into the fixture housing.

7. The light fixture system of claim 1, wherein the first joiner is configured to be retracted on a first end of the first light fixture and the second joiner is configured to be retracted on a second end of the second light fixture until being slid towards each other.

8. The light fixture system of claim 1, wherein the first joiner is configured to protrude past a first end of the first light fixture and the second joiner is configured to protrude past a second end of the second light fixture to make electrical connection in response to being slid towards each other and the axial force from the at least one set screw.

9. The light fixture system of claim 1, wherein the optical element comprises a lens, a diffuser, or a combination thereof.

10. The light fixture system of claim 1, wherein the at least one set screw is oriented at approximately 45 degrees.

11. The light fixture system of claim 1, wherein the first light fixture and the second light fixture are pendant type.

12. The light fixture system of claim 1, wherein the first light fixture and the second light fixture are recessed type.

13. A light fixture joining assembly, comprising:

a first fixture wire harness coupled to a first electrical connector mounted to a first joiner, wherein the first joiner is configured to attach to a first light fixture;

a second fixture wire harness coupled to a second electrical connector mounted to a second joiner, wherein the second joiner is configured to attach to a second light fixture;

wherein the first joiner and the second joiner are configured to slide towards each other and each include at least one set screw configured to be tightened through at least one slot to apply axial force between adjoining light fixtures to make electrical connection and tighten a joint between the first light fixture and the second light fixture, the at least one slot being located underneath a light source circuit board to allow access to the first and second joiners after the adjoining light fixtures are lifted in the ceiling; and an optical element configured to conceal the at least one slot allowing access to the first and second joiners.

14. The light fixture joining assembly of claim 13, wherein the first joiner and the second joiner include an arm or a protrusion configured to slide toward each other.

15. The light fixture joining assembly of claim 13, wherein the arm or the protrusion are integral to the first joiner and the second joiner.

16. The light fixture joining assembly of claim 13, wherein the first joiner is configured to be retracted on a first end of the first light fixture and the second joiner is configured to be retracted on a second end of the second light fixture until being slid towards each other.

17. The light fixture joining assembly of claim 13, wherein the first joiner is configured to protrude past a first end of the first light fixture and the second joiner is configured to protrude past a second end of the second light fixture to make electrical connection in response to being slid towards each other and the axial force from the at least one set screw.

18. The light fixture joining assembly of claim 13, wherein the at least one set screw is oriented at approximately 45 degrees.

19. The light fixture joining assembly of claim 13, wherein the light fixtures are pendant type or recessed type.

* * * * *